No. 758,603. PATENTED APR. 26, 1904.
W. COLWELL.
THRESHING MACHINE.
APPLICATION FILED DEC. 20, 1902.
NO MODEL. 3 SHEETS—SHEET 1.
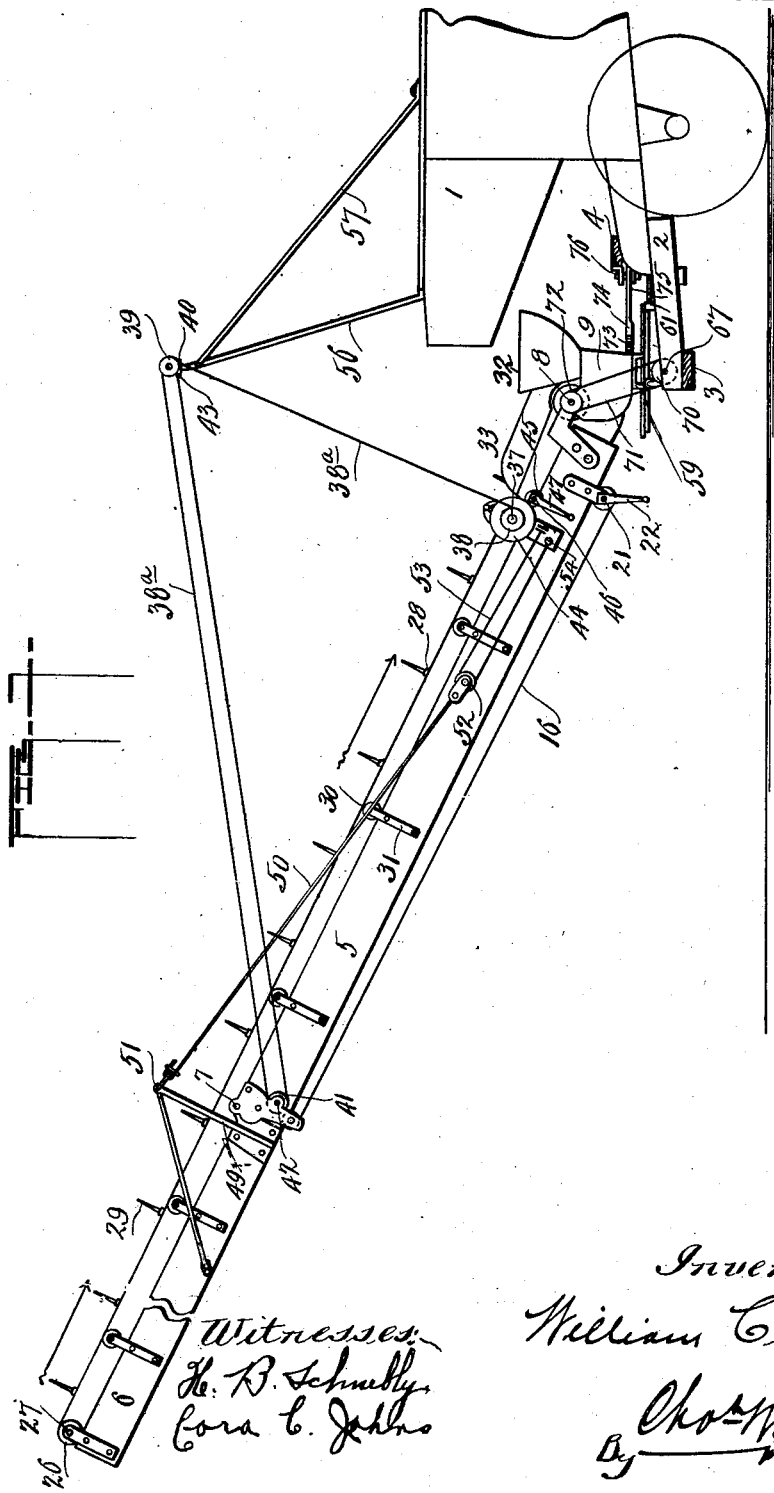
Witnesses:
H. B. Schnebly
Cora C. Johns
Inventor,
William Colwell.
By Thos. W. LaPorte
Atty.

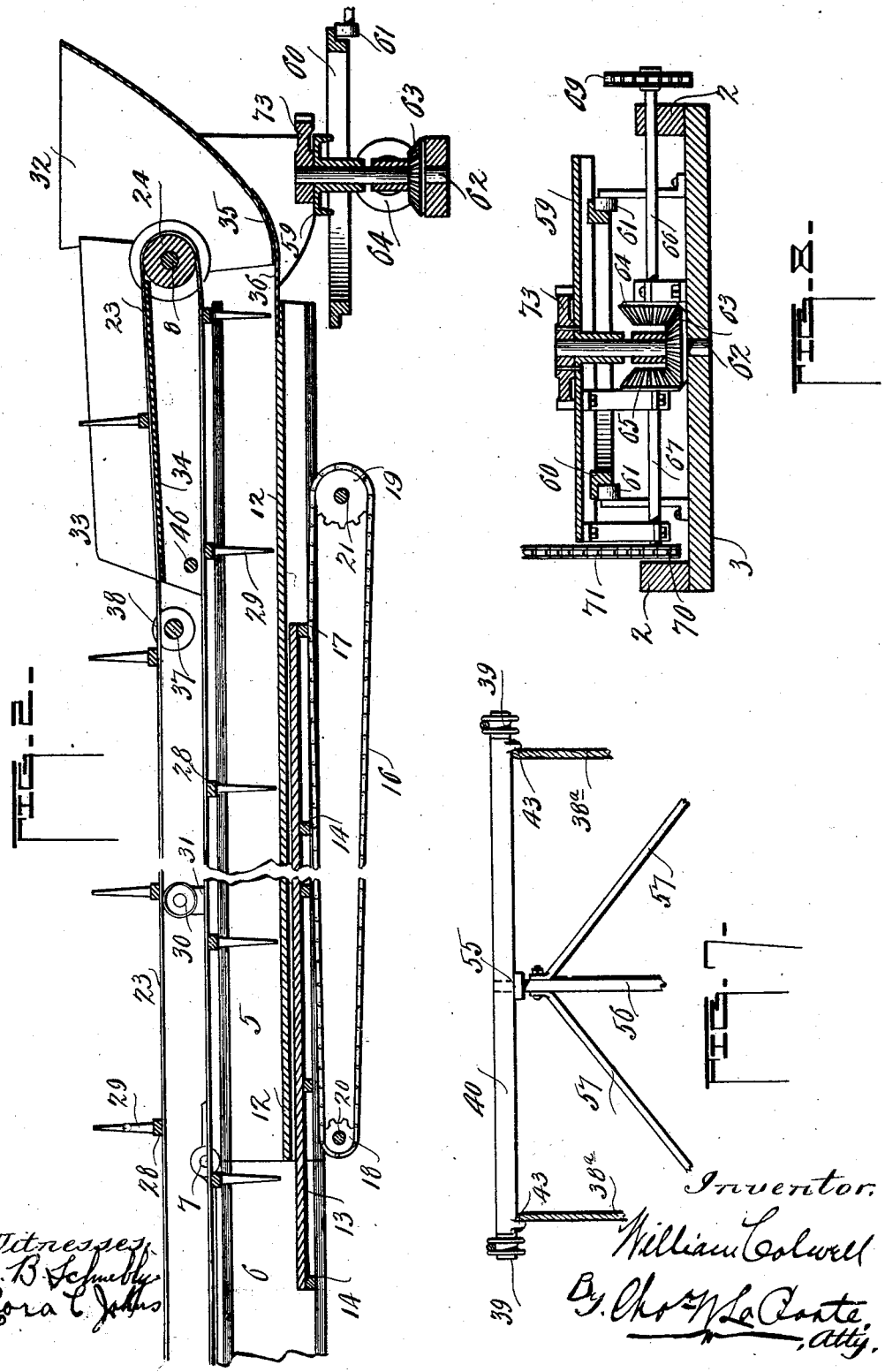

No. 758,603. PATENTED APR. 26, 1904.
W. COLWELL.
THRESHING MACHINE.
APPLICATION FILED DEC. 20, 1902.
NO MODEL. 3 SHEETS—SHEET 3.
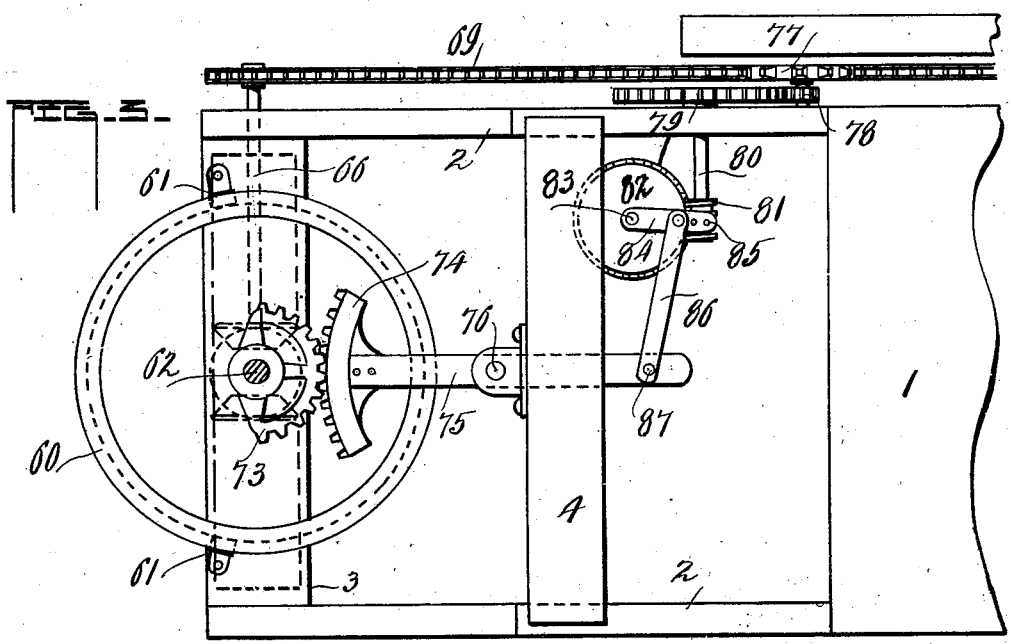
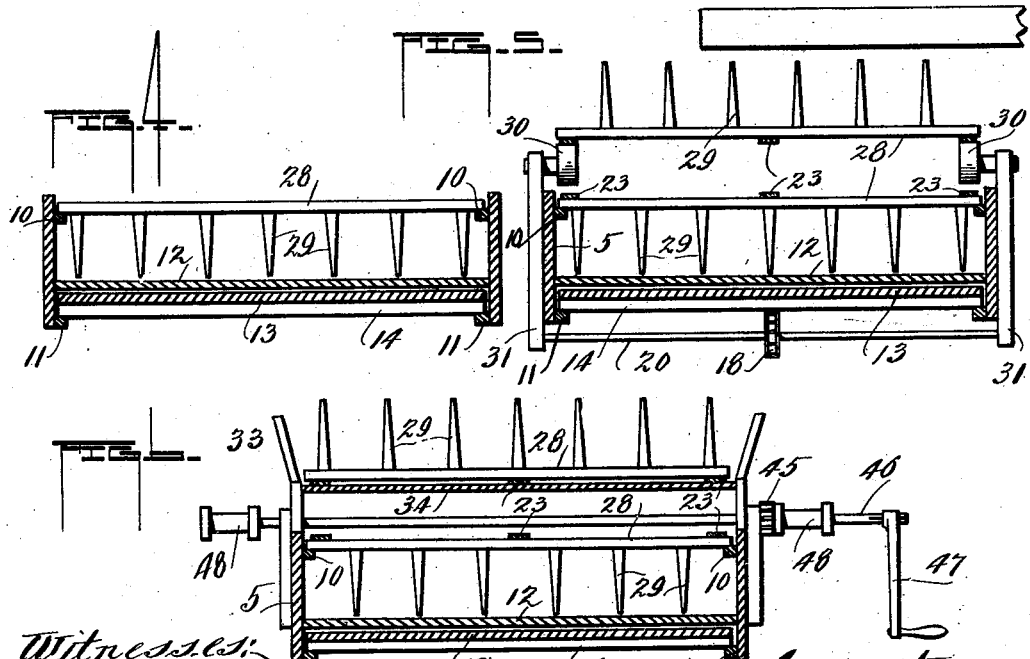

No. 758,603. Patented April 26, 1904.

UNITED STATES PATENT OFFICE.

WILLIAM COLWELL, OF CHILLICOTHE, ILLINOIS.

THRESHING-MACHINE.

SPECIFICATION forming part of Letters Patent No. 758,603, dated April 26, 1904.

Application filed December 20, 1902. Serial No. 136,062. (No model.)

*To all whom it may concern:*

Be it known that I, WILLIAM COLWELL, a citizen of the United States, residing at Chillicothe, in the county of Peoria and State of Illinois, have invented certain new and useful Improvements in Threshing-Machines; and I do hereby declare that the following is a full, clear, and exact description of the invention, which will enable others skilled in the art to which it appertains to make and use the same.

This invention has reference to straw-stackers having a swingable and foldable connection with a threshing or like machine in which the straw is carried as distinguished from wind-stackers, in which it is dragged, raked, or propelled; and the object which I have in view is to provide improved and simplified means for varying the operative length of the stackers, so as to positively control the point of discharge of the straw which is accomplished by an under-draft drag of invariable length and an extensible bottom therefor of variable length.

A further object of the invention is an automatically-swinging support for the inner end of the carrier-frame; and the invention consists, further, of simplified means whereby one operator may fold or unfold the forward end of the carrier-frame and of suitable devices for raising or lowering such carrier-frame.

In constructing a straw-carrier in accordance with my invention a carrier-frame or a section of a carrier-frame is made of any desired length or proportion and in two sections pivotally attached to each other and an upper presented hopper formed on the receiving end of the carrier-frame in a manner to receive falling straw discharged from the rear end of the threshing-machine, to which the carrier is attached, and an endless under-draft drag mounted on rollers placed throughout the length of the carrier-frame, and the slats to which the drag of the carrier is attached are movable upon cleats or runways attached to the sides of the carrier-frame, and the bottom of the carrier-frame underneath the drag, made of two sections, one of which is extensible or shiftable with relation to the discharge end of the drag. Straw is supplied to the hopper from the threshing-machine and is directed to the bottom of the carrier-frame and is moved along said bottom by the lower run of the under-draft drag, which has a tendency to rake the straw along the said bottom, and thereby discharge at a point in the length of the carrier-frame dependent on the position of an extensible bottom portion thereof. If the extensible bottom is not extended, the discharge of the straw will be at the end of the fixed bottom portion of such carrier. If the extensible portion is extended to the discharge end of the drag, the straw will be carried that distance, and to whatever extent the bottom may be extended between the outer end of the stationary bottom and the end of the drag the travel of the straw will be correspondingly curtailed.

That my invention may be more fully understood, reference is had to the accompanying drawings and the detailed description thereof.

Figure 1 is a side elevation, on a greatly-reduced scale, showing my improved carrier-frame swingably supported to a thresher, the carrier-frame shown having the forward extension thereof broken in two. Fig. 2 is an enlarged longitudinal section of a portion of the carrier-frame. Fig. 3 is an enlarged partial plan of the devices for swinging the carrier-frame. Figs. 4, 5, and 6 are enlarged cross-sections through the carrier-frame. Fig. 7 is an enlarged elevation of a pivoted evener and its support designed to be carried by and above the thresher and carrying sheave-wheels, around which the ropes which are used for raising and lowering the carrier-frame are carried. Fig. 8 is a transverse sectional view of the gearing for transmitting power to the under-draft drag and also the support for the hopper-base.

In the drawings, 1 indicates the rear portion of a threshing-machine having the extended sills 2 and their cross-braces 3 and 4. Mounted to have a swingable relation upon the supporting-sills 2 is a straw-carrier composed of the side pieces 5 and 6.

5 indicates the side pieces of the inner run of the carrier, and 6 the side pieces of the outer run of the carrier, which are hinged at 7 to the side pieces 5 and adapted to be folded over in transportation onto the inner run of the carrier, and the side frame-piece of both the outer and inner run of the carrier may be suitably braced together. The inner end of the carrier-frame has a pivoted connection at 8 with a hopper-support, which in turn is suitably mounted upon a turn-table, to be hereinafter described. On the inner faces of the side pieces 5 and 6 I have provided longitudinal cleats or runways 10 and 11, the cleats 10 disposed just below the upper edges of the frame-pieces and the cleats 11 disposed approximately upon the inside of the pieces at their lower edges and forming a supplemental supporting-frame for a slidable bottom-section, to be described, arranged below the carrier-frame, and 12 indicates a fixed bottom or partition extending the length of the inner run (composed of side pieces 5 of the carrier) and in the position shown in the figures.

13 refers to an extensible or shiftable bottom or partition supported by cleats 14, slidably mounted on the cleats 11, extending longitudinally of the carrier-frame. This partition 13 is approximately the same length as the partition or bottom 12 and is designed when not extended to lie beneath the partition 12 and is attached to means whereby the said partition 13 may be extended, so that its outer end will coincide with the outer free end of the forward run of the carrier, composed of the side pieces 6, or stopped at any point intermediete the front end of the fixed partition 12 and the front end of the carrier, and the mechanism for extending the shiftable bottom 13 consists of a chain 16 or similar device to which the sliding bottom 13 has a fixed connection, as at 17, and the said chain has connection with and rotates around sprocket-wheels 18 and 19, carried by transverse shafts 20 and 21, disposed upon the carrier-frame in the position shown in the figures, and 22 is a crank adapted to be attached to the shaft 21 to facilitate in moving the chain 16 for adjusting the position of the slide-bottom 13.

I will now describe the under-draft drag and its relation with the carrier-frame and its stationary and slidable bottoms. The drag consists of a series of endless belts or similar devices 23, adapted to travel around rollers 24 at the inner end of the carrier-frame, which rotate with the transverse shaft 8, on which the carrier-frame swings, and around rollers 26, which rotate on shaft 27, journaled transversely across the forward end of the carrier in the manner shown. Transversely disposed at intervals apart and supported by the belts 23 I provide slats or cleats 28, and 29 represents suitable fingers extended from the slats, each alternate slat being provided with an uneven number of fingers. The carrier proper, consisting of belts 23, as they move forwardly are in such a position that the outer free ends of the fingers 29 move longitudinally above and adjacent to the bottom of the frame, and slats 28 are caused to rest upon and move along the upper face of the cleats 10, (see Figs. 2 and 4,) and on their backward journey the belts 23 are supported above the frame of the carrier by rollers 30, carried by supports 31.

To facilitate the delivery of the straw to the hopper, designated as 32, supported by the hopper-support 9, and to direct it to the lower or under run of the drag, a casing of suitable length having the side boards 33 is built immediately in front of the hopper and forms a part of the frame-pieces 5, and the belts 23 forming the drag are directed over a partition 34, forming a part of casing 33, and thence around the rollers 24. The body of the hopper extends down and has a curved bottom 35 approximately struck on a radius whose center line is the center of the shaft 8, and 36 is a plate extension from the bottom of partition 12 and extends beneath the bottom portion 35 of the hopper and conforms to the contour thereof and facilitates the extension of the hopper-bottom. When the carrier-frame is raised or lowered, the plate 26 will swing forward or backward, and yet form an extension of the hopper for the feed of straw therein to be engaged by the lower run of the carrier and drag or rake it along the bottom thereof.

The means for swinging the carrier on its pivot formed by the shaft 8 consists of a transverse shaft 37 on the opposite ends of which are carried drums 38, and around these drums are coiled cables $38^A$, which extend up and around sheave-wheels 39, carried upon opposite ends of a pivoted evener 40, and the cable extends down and around sheave-wheels 41, journaled at 42 to the forward ends and upon the sides of the frame-pieces 5 and back again to the evener 40, and the free end of the cable is securely fastened at 43 to such evener. On one side of the shaft 37 is carried a gear-wheel 44, meshing with a pinion 45 on a crank-shaft 46, and by means of a crank 47, attached to crank-shaft 46, motion is imparted to the shaft 37 through the gear just described and in turn rotates the drums 38, by means of which through the cables the carrier may be raised or lowered, all of which is believed is apparent from the drawings. The crank-shaft 46 is used for the further purpose through suitable connecting devices with the forward run of the carrier-frame for folding the same over and upon the inner run of the carrier-frame, or vice versa. This mechanism consists of drums 48, (see Fig. 6,) carried upon crank-shaft 46, and the said crank-shaft is slidable in its bearings to adapt the disconnecting of the pinion 45 with the larger gear 44. To the forward run of the carrier-frame and attached to the sides 6 and extending up therefrom adjacent to their pivots are rods 49. Suitably attached to the sides 6 and 50 are rearwardly-extended rods, which at one end have a pivoted connection with the rods 49 at 51 and carrying on their opposite ends sheave-wheels 52, and around the sheave-wheels are carried cables 53, one end of which has a fixed connection to pieces 5, and the rear ends of such cables when it is designed to fold or unfold the forward run of the carrier are attached to the drums 48 of the crank-shaft 46, and by such connection through the rods of the crank 47 the forward run is swung on its pivot 7. After it has passed a dead-center the crank-shaft is revolved in an opposite direction and allowed to fall slowly on the inner run of the frame. This folding or unfolding of the forward run of the frame may be conveniently handled by one operator and is accomplished in the manner herein stated after first disconnecting the gears 44 and 45, and the same power used for raising or lowering the carrier proper is employed for folding or unfolding the forward run of the frame. To retain the gears 44 and 45 in proper position during the raising and lowering of the carrier, I have provided a dog 58, supported in a suitable manner from one of the frame-pieces 6, which engages the teeth of the gear and acts as a ratchet against such teeth for locking, all of which are believed to be understood. Referring to the evener 40, upon the ends of which are journaled the sheave-wheels 39, the same has a pivoted connection at 55 with a support 56, extending up from the top of the threshing-machine and suitably braced by rods 57. The swing of the evener 40 is in a vertical line directly above the center swing of the carrier proper on a support, which will now be described, which clearly facilitates in the raising and lowering of the carrier-frame during a swinging movement, which may be imparted thereto.

The devices for automatically swinging the carrier-frame and varying the length of such swinging movement consist of a transversely-carried frame 59, to which the hopper-support 9 is secured, and this frame is supported on a turn-table 60, revolubly carried on rollers 61.

62 indicates a short vertical shaft which is stationarily carried in the cross-brace 3 and passes up through a bearing of frame 59, the latter adapted to rotate thereon.

At or near the base of the shaft 62 is carried a bevel-wheel 63, and meshing with such bevel-wheel are bevels 64 and 65, which are carried upon similar shafts 66 and 67, and it is through the shafts 66 and 67 that power is imparted to the shaft 8 for moving the under-draft drag. This is accomplished by a sprocket-chain 69, having connection with a suitable source of power, and by such sprocket-chain the shaft 66 is rotated and in turn, through the bevel-gearing just described, the shaft 67 is rotated, and this shaft carries a sprocket-wheel 70, which through sprocket-chain connection 71 is rotated a sprocket 72, carried by the shaft 8, around which the belts 23 of the drag are carried.

On the upper end of shaft 62 and having a fixed connection with the frame 59 is shown a segmental gear 73, and meshing with this gear 73 is a rack 74, which has a rearwardly-extended reach 75, pivoted at 76 on a suitable support. Upon the thresher is carried a sprocket 77, engaged by a chain 69, and on the shaft which carries the sprocket 77 is a pinion 78, meshing with a gear 79, carried by a short shaft 80, and on the opposite end of such shaft is a worm 81, which meshes with a worm-wheel 82 on a short shaft 83. Attached to the short shaft 83 is a crank 84, having a series of perforations 85, and 86 is an arm adapted to have a pivoted connection with either of the perforations 85 and with the reach 75 at 87. When it is designed to automatically swing the carrier-frame and also to determine just what the swing shall be, the reach 86 is employed and attached to reach 75 at 87 and with either of the perforations 85 in the crank 84, and the power which is imparted to the chain 69 for moving the under-draft drag is imparted through the sprocket 77 and its gearing to the worm 81 and worm-wheel 82 and to the arm 86 through the crank 84, which oscillates the arm 75 and by such movement transmits a suitable motion to the carrier-frame through the segmental gear 73, rotating on the stationary shaft 62 and which is secured to the frame 59, carrying the hopper-support 9. To detach or disconnect the gearing for swinging the carrier, all that is necessary to do is to disconnect the arm 86 from the crank 84 and the reach 75.

This application is designed as a substitute for an application filed by me on November 10, 1898, bearing Serial No. 696,097, and embodies in its structure the features herein enumerated, such as the automatic swinging mechanism, the raising and lowering devices, and the means for folding and unfolding the outer run of the carrier-frame, and in details of construction of the carrier proper.

Having thus fully described my invention, what I claim, and desire to secure by Letters Patent of the United States, is—

1. In a threshing-machine, the combination therewith, of a carrier-frame formed of two hinged sections, means for folding the sections upon each other, the inner section supported upon a table adapted to be automatically swung, a fixed bottom or partition for a portion of such carrier and a slidable bottom connected with means whereby it may be extended beyond the end of the fixed bottom, and an endless under-draft drag extending from the receiving end of the carrier to the outer end thereof, substantially as specified.

2. In a threshing-machine, the combination therewith of a carrier-frame mounted at its receiving end upon a table adapted to be automatically swung, an outer run of the carrier hinged to the main body thereof and means for folding or unfolding such outer run, an endless under-draft drag extending from the receiving end of the carrier to the forward end of the outer run thereof, a stationary bottom for the inner end of the carrier and an extensible bottom slidably arranged in the carrier-frame beneath the stationary bottom and adapted to have a slidable relation with the walls of the outer run of such carrier, all substantially as described.

3. In a threshing-machine, the combination therewith of a carrier-frame formed of two hinged sections, the inner sections supported upon a frame adapted to be automatically swung, gearing carried by such inner section and means on the outer section adapted to have connection with such gearing for folding and unfolding the outer section, an endless under-draft drag extending from the receiving end to the outer end of such carrier consisting of a series of belts supporting transversely-carried slats from which extend suitable fingers, a fixed bottom for the inner section, and a sliding bottom capable of longitudinal movement upon cleats of the inner and outer sections, whereby the position of the outer end of the carrier-bottom may be varied, substantially as described.

4. In a threshing-machine, the combination therewith of a carrier-frame supported at its inner end upon means adapted to be automatically swung, an endless under-draft drag extending from the receiving end of the carrier to the outer or the free end thereof consisting of a series of belts carrying transverse slats from which extend suitable fingers, the slats of the carrier during its forward movement movable upon cleats within the carrier, a fixed bottom arranged below and substantially parallel with the lower run of the carrier and extending from its receiving end to a suitable point in its length, and a supplemental bottom slidably supported upon cleats and longitudinally movable beneath the fixed bottom whereby the position of the outer end of the carrier-bottom in advance of the fixed bottom may be varied, substantially for the purpose described.

5. In a threshing-machine, the combination therewith of a carrier-frame swingably supported for vertical movement to a hopper-support, means for automatically swinging such hopper-support, a fixed bottom for such carrier-frame extending only a portion of the length thereof, cleats longitudinally arranged upon the sides of such carrier and the length thereof, a slidable bottom longitudinally movable upon the lower cleats, an endless under-acting carrier extending from the hopper to the free end of the frame-carrying fingers movable above and adjacent to the fixed bottom of such carrier and in its forward movement movable upon the upper longitudinal cleats of the frame, substantially as described.

6. In a threshing-machine, the combination therewith of a carrier-frame having its inner end pivoted for vertical movement to a hopper-support, devices for swinging such hopper-support, a casing for the carrier from the hopper-support, to a suitable point in its length and an endless under-acting carrier extending from the hopper-support to the free end of the carrier-frame, with said carrier movable upon longitudinal cleats in the carrier-frame and the upper run of such endless carrier supported upon rollers, a bottom arranged directly below and substantially parallel with the lower run of the carrier and having an under-acting outer slidable adjustable section and means for moving said section for varying the position of the outer end of such bottom, substantially as described.

7. In a threshing-machine, the combination of a carrier-frame of two hinged sections, a vertically and horizontally swingable support for such frame, a bottom for such carrier of two sections, one of which is fixed, the other section longitudinally movable beneath the fixed section and as an extension thereof, and means for sliding the movable section for varying the position of its outer free end, substantially as described.

8. In a threshing-machine, the combination therewith, of a carrier-frame formed of two hinged sections mounted for vertical and horizontal movement upon such thresher, means for folding the sections upon each other, a fixed bottom for such carrier-frame extending a portion of its length, a longitudinally slidable and adjustable bottom section beneath the fixed bottom and adapted to be extended in advance thereof for varying the position of the outer free end of the carrier-bottom and suitable gearing to which the slidable bottom has a fixed connection for moving such sliding bottom within the carrier-frame, substantially as specified.

9. In a threshing-machine, the combination therewith of a carrier-frame swingably supported to the thresher, a pivoted evener supported by the thresher and connecting devices between such evener and carrier-frame and gearing supported by such carrier for actuating the aforesaid devices for raising and lowering such frame, substantially as described.

10. In a threshing-machine, the combination of a carrier-frame, having a swingable connection with the thresher, the support 59 mounted upon the table 60, the shaft 62, a segmental gear attached to the frame 59, power devices and connections between such power devices and the segmental gear of the support 59 for swinging the latter, substantially as described.

11. In a threshing-machine, the combination of a carrier-frame having a swingable connection with such thresher, an under-acting carrier in the frame, the shaft 62 means rotating thereon and actuated by suitable power devices for swinging the carrier-frame, the bevel-gear 63, shafts 66 and 67 having gears meshing with the bevel 63, power connections with the shaft 66, and driving connections between the shaft 67 and the under-acting carrier of the carrier-frame, all substantially for the purpose set forth.

12. In a threshing-machine, the combination therewith of a drag pivotally attached to the thresher, an evener disposed above the thresher-body and pivoted on its support, gearing, and devices attached to the drag and evener adapted to be actuated by the gearing to facilitate in the raising and lowering of the drag, substantially as specified.

13. In a threshing-machine, the combination therewith of a drag pivotally attached to the thresher, sheave-wheels attached to the body of the drag, an evener disposed above the thresher-body and pivoted on its support, sheave-wheels upon the opposite ends of the evener, gearing, and cables having one end secured to the opposite ends of the evener, extending around the sheave-wheels on the drag to and around the sheave-wheels on the evener and their opposite ends connected with aforesaid gearing, as and for the purposes set forth.

14. In a device of the class described, the combination of the carrier-frame, the endless carrier thereon, the boot or hopper at the lower end, the bottom having a stationary section below the carrier, a supplemental support supported below the carrier-frame, the longitudinally-slidable bottom section supported on the said supplemental support, and the adjusting devices connected to the lower end of the slidable bottom section, substantially as set forth.

In testimony whereof I affix my signature in presence of two witnesses.

WILLIAM COLWELL.

Witnesses:
   CHAS. W. LA PORTE,
   CORA C. JOHNS.